(12) United States Patent
Guering

(10) Patent No.: US 9,340,293 B2
(45) Date of Patent: May 17, 2016

(54) AIRCRAFT FLIGHT DECK COMPRISING A FOLDING SEAT

(71) Applicant: Bernard Guering, Montrabe (FR)

(72) Inventor: Bernard Guering, Montrabe (FR)

(73) Assignee: Airbus Operations (S.A.S.), Toulouse (FR)

( * ) Notice: Subject to any disclaimer, the term of this patent is extended or adjusted under 35 U.S.C. 154(b) by 488 days.

(21) Appl. No.: 13/628,206

(22) Filed: Sep. 27, 2012

(65) Prior Publication Data

US 2013/0126671 A1 May 23, 2013

(30) Foreign Application Priority Data

Sep. 30, 2011 (FR) ..................................... 11 58792

(51) Int. Cl.
*B64D 11/06* (2006.01)
*B64D 45/00* (2006.01)
*B64C 1/14* (2006.01)

(52) U.S. Cl.
CPC ............. *B64D 11/0689* (2013.01); *B64D 11/06* (2013.01); *B64D 11/0691* (2014.12); *B64C 1/1469* (2013.01); *B64D 45/0015* (2013.01)

(58) Field of Classification Search
CPC ........... B64D 11/0689; B64D 11/0691; B64D 45/0015; B64C 1/1469
See application file for complete search history.

(56) References Cited

U.S. PATENT DOCUMENTS

| | | | |
|---|---|---|---|
| 3,594,037 A * | 7/1971 | Sherman | ................. A47C 1/036 297/14 |
| 4,902,069 A | 2/1990 | Lehnert | |
| 4,993,666 A | 2/1991 | Baymak et al. | |
| 6,659,401 B1 * | 12/2003 | Semprini | .............. B64C 1/1469 244/118.5 |
| 7,156,344 B1 | 1/2007 | Guering | |
| 7,578,477 B2 * | 8/2009 | French | ................... B64C 1/1469 244/117 R |
| 7,600,716 B2 * | 10/2009 | French | .................. B64C 1/1469 160/130 |
| 8,028,960 B2 | 10/2011 | Van Wassenhove et al. | |
| 2003/0066931 A1 | 4/2003 | Ward | |
| 2005/0116098 A1 * | 6/2005 | Martens | ................. B64C 1/1469 244/118.5 |
| 2005/0230550 A1 | 10/2005 | Dominguez | |

(Continued)

FOREIGN PATENT DOCUMENTS

| | | |
|---|---|---|
| CN | 101184666 A | 5/2008 |
| EP | 0282541 | 9/1988 |

(Continued)

OTHER PUBLICATIONS

French Search Report for Application No. FR 1158792 dated May 30, 2012.

(Continued)

*Primary Examiner* — Valentina Xavier
*Assistant Examiner* — Michael Kreiner
(74) *Attorney, Agent, or Firm* — Jenkins, Wilson, Taylor & Hunt, P.A.

(57) ABSTRACT

There is provided an aircraft folding seat, comprising a frame which pivots about a vertical axis and on which are mounted a seat-rest and a back-rest. The flight deck provided comprises control and/or viewing devices, at least one seat, an access door and a corridor for access to the at least one seat which is closed at its opposite end to the at least one seat by the access door. A folding seat is mounted in the corridor such that it can pivot and adopt a first position in which it closes the corridor so forming a lock enclosure with the access door and a folded back second position enabling access to the at least one seat from the corridor.

14 Claims, 5 Drawing Sheets

(56) References Cited

U.S. PATENT DOCUMENTS

| | | |
|---|---|---|
| 2008/0179457 A1 | 7/2008 | Guering |
| 2009/0065641 A1 | 3/2009 | Koehn et al. |
| 2010/0288881 A1* | 11/2010 | Helfrich ............... B64C 1/1469 244/118.6 |

FOREIGN PATENT DOCUMENTS

| | | |
|---|---|---|
| EP | 0349762 | 1/1990 |
| FR | 2547273 | 12/1984 |
| FR | 2900634 | 11/2007 |
| FR | 2903661 | 1/2008 |
| WO | WO 88/01967 A1 | 3/1988 |

OTHER PUBLICATIONS

Eurpoean Search Report for Application No. EP 12 18 6328 dated Sep. 12, 2013.

Chinese Office Action for Application No. 201210597613.9 dated Aug. 4, 2015.

* cited by examiner

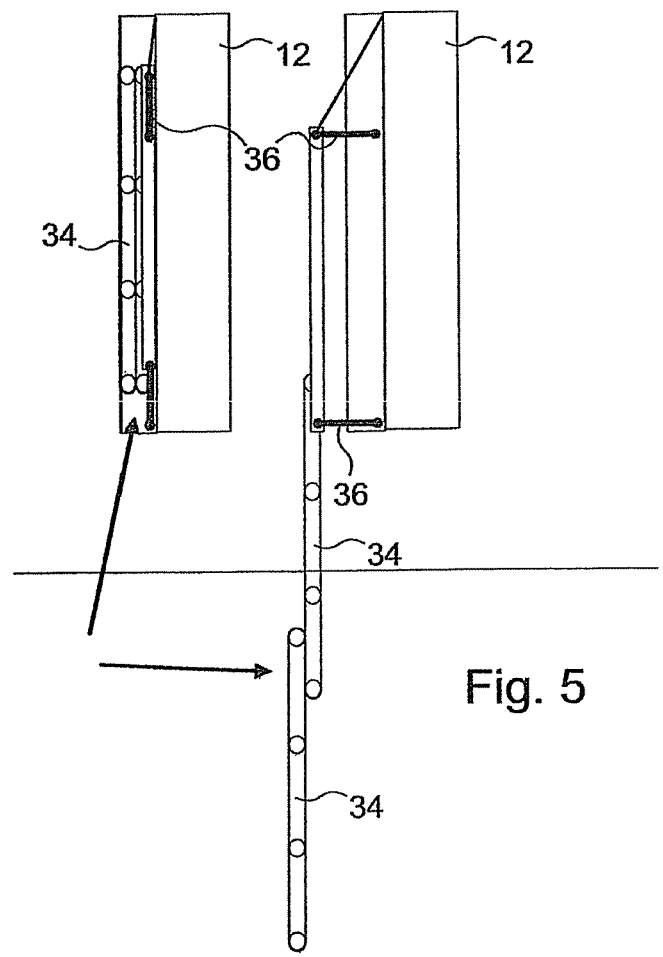
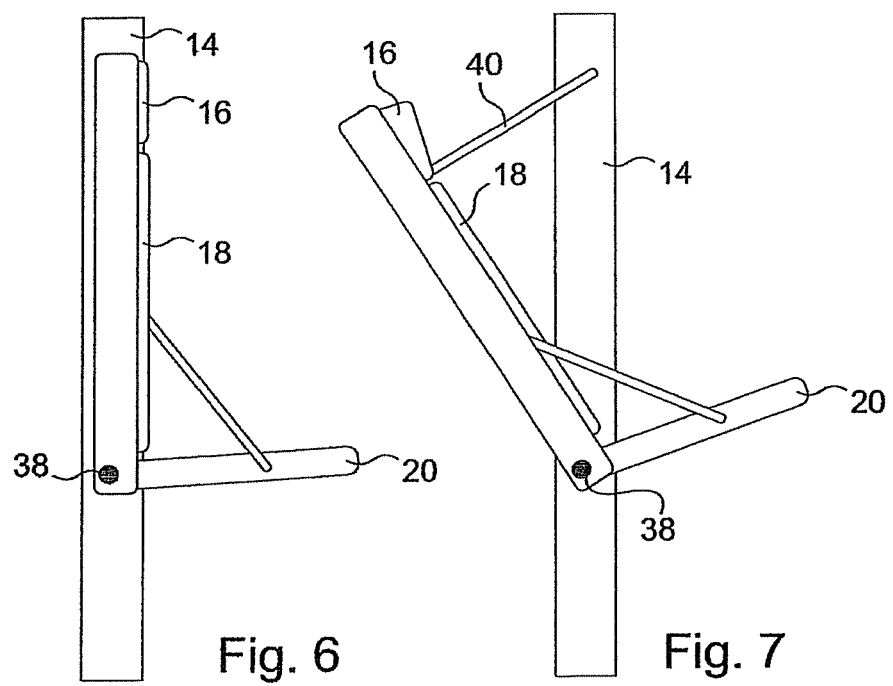
Fig. 5
Fig. 6    Fig. 7

AIRCRAFT FLIGHT DECK COMPRISING A FOLDING SEAT

TECHNICAL FIELD

The present invention concerns an aircraft flight deck equipped with a folding seat.

BACKGROUND

The field of the present invention is the interior layout of an aircraft flight deck, also called aircraft cockpit or more generally the front portion of an aircraft. Of concern here are commercial aircraft, for the transport of passengers and/or goods. Such an aircraft thus conventionally comprises a front portion adapted in general to receive a pilot and a co-pilot as well as a "commercial" part disposed aft of the front portion to receive the passengers and/or goods.

In a cockpit of such an aircraft, there is thus a seat for the pilot and another seat for the co-pilot. It also occurs that a third seat is provided in the cockpit for an observer or an instructor. As this third seat is only used exceptionally, it is in general a folding seat.

A folding seat for an aircraft is described for example in document EP-0 282 541 or in document EP-0 349 762. These documents solely concern the structure of a folding seat but not its integration into an aircraft.

Document FR-2 547 273 describes an ergonomic aircraft flight deck provided for two pilots but no provision is made in the description of that document for the presence of a third (or other) member of the crew. As for document FR-2 903 661 which concerns a general structure for an aircraft, it shows in its FIG. 5 an example of a layout for a flight deck of an aircraft for three persons. Document FR-2 900 634 also shows a flight deck with three seats, but for an aircraft essentially for military use. In a military aircraft, the technical and economic constraints are different in many respects compared with the constraints encountered for production of a civil aircraft for commercial use.

SUMMARY

The present invention is directed to providing ergonomic means for enabling a third person to be accommodated in seated position in an aircraft cockpit. That cockpit is preferably optimized from different points of view.

The space occupied by the third seat is preferably limited. Advantageously, the solution provided by the invention is adaptable for single aisle aircraft (for example the family of aircraft commercialized by the Airbus company under the trademark A320) as well as for aircraft of larger size.

In a conventional manner, an aircraft cockpit comprises numerous items of technical equipment (computers, systems, etc.). The integration of a third seat (in addition to the seat of a pilot and the seat of the co-pilot) is preferably not to the detriment of the layout of the technical equipment.

A cockpit also has safety constraints. Intrusion into the cockpit by an unauthorized person should be avoided. The invention also provides for these constraints to be integrated.

A cockpit conventionally also has an emergency exit upwards and an access to an equipment hold. Preferably, the present invention makes it possible to facilitate the access to the means enabling emergency evacuation upwards and/or enables easy access to the equipment hold.

It has been noted that when an additional seat is present in a cockpit, it is increasingly often used for the transport (most often without payment of a fare) of a person (for example flight crew) in order not to monopolize a seat in the aircraft cabin. The additional seat is then preferably comfortable to enable comfortable use, even over a relatively long period.

The present invention aims to mitigate at least some of the aforesaid drawbacks.

To that end, there is provided a flight deck of an aircraft comprising control and/or viewing devices, at least one seat, an access door, and a corridor for access to said seat which is closed at its opposite end to said seat by the access door.

According to the present invention, a folding seat comprising a frame which pivots about a vertical axis and on which are mounted a seat-rest and a back-rest, is mounted in the corridor such that it can pivot and adopt a first position in which it is closes the corridor so forming a lock enclosure with the access door and a second position in which it enables the access to said seat from the corridor.

Such a configuration of the flight deck enables space optimization. To be precise, it is thus possible to provide an additional seat (the folding seat) in the flight deck without providing additional space dedicated to that seat.

Such an aircraft folding seat, comprising a frame on which are mounted a seat-rest and a back-rest, also advantageously comprises a head-rest.

The fact of making a folding seat, which is generally integrated into a fixed frame, into a movable item, enables the folding seat to be made to take several positions and to fulfill various functions as explained later. Furthermore, if it is integrated into a door, space saving may be obtained by that integration.

In an embodiment of a folding seat according to the invention, its frame comprises vertical uprights, and one of the vertical uprights is provided with fastening means enabling it to be fastened to a jamb so as to be able to pivot through an angle of at least 135°. Preferably, the folding seat is able to pivot through at least 180°, for example up to 270°.

In order to be more versatile and serve for example as a seat for an observer or quite simply a seat for a passenger, a folding seat according to the invention is advantageously such that the height of its seat-rest is adjustable. For improved comfort, its back-rest may be tiltable.

When the folding seat must also fulfill functions of providing security for the cockpit that it equips and must form an armored door, it advantageously comprises in its lower portion and in its upper portion respectively an armored sliding plate. For the same functions, the back face of the seat-rest, the back face of the back-rest and, where present, the back face of the head-rest, that is to say in each case the face not adapted to come into contact with a user of the folding seat, are advantageously reinforced so as to be resistant to the impact of projectiles from a firearm.

For an advantageous embodiment in which the folding seat may be used to facilitate the access to a lower hold, said folding seat bears on its back face, that is to say the opposite face to that adapted to receive a user, a ladder mounted via at least one four-bar linkage parallelogram.

In an advantageous embodiment, it is provided that the folding seat is, in its second position, folded back against a member delimiting the corridor and that it can also adopt a third position pivoted through at least 135° relative to the second position.

An advantageous embodiment provides for the access corridor to comprise a floor in which is located a hatch door for access to a lower equipment zone. The access hatch door is then preferably positioned such that it is located rearward of the folding seat in one position thereof. The access hatch door is located for example in immediate proximity to the folding seat, and preferably just behind the folding seat, when the folding seat is in its first position.

An aircraft flight deck according to the invention is advantageously also such that the access corridor comprises a ceiling in which is located a hatch door for rescue and emergency evacuation. The rescue hatch door and the folding seat are positioned in relation to each other such that the rescue hatch is able to be located above the seat-rest—when in a substantially horizontal position—of the folding seat in one of the positions the folding seat can adopt, for example when the folding seat is folded back against a member delimiting the corridor.

In a preferred embodiment, adapted in particular for a flight deck initially comprising two seats (and therefore in addition a folding seat in accordance with the invention), the corridor is delimited laterally by furniture. In this way, the corridor may be centered relative to the axis of the aircraft and thus exit between the two seats provided respectively for a pilot and a co-pilot. A corridor may however be provided that is delimited on one side by at least one wall, or something else, and not by furniture (not only storage space but also for example an equipment cabinet for avionics systems or else for kitchens or other equipment for comfort).

When the corridor is disposed between furniture, it is advantageously provided for at least one item of furniture to comprise a structural upright and for the folding seat to be pivotally mounted relative to said structural upright. That structural upright thus has two roles and it is not necessary to recreate an upright for the folding seat.

For the flight deck according to the invention, as already mentioned earlier, the folding seat may comprise in its lower portion and in its upper portion in each case a sliding plate, preferably armored. Advantageously, for reasons of security, the folding seat reinforced in this way, possibly using one or more armored sliding plates closes the access to the cockpit and thereby forms a security lock enclosure. The folding seat in its first position thus closes the lock enclosure using the sliding plates.

Similarly, the back face of the folding seat, that is to say the face not adapted to come into contact with a user of the folding seat, is advantageously reinforced so as to be resistant to the impact of projectiles from a firearm, for example by virtue of an armored plate.

As has already been mentioned, it is also possible to provide for the folding seat of a flight deck according to present invention to bear on its rear face, that is to say the opposite face to that adapted to receive a user, a ladder mounted via at least one four-bar linkage parallelogram.

In a flight deck according to the invention, the folding seat may be adjustable in height, for example by providing for the folding seat to be mounted on structural components of the flight deck via at least one intermediate member of profiled cross-section able to slide on a structural, component bearing the folding seat.

It may also be provided for the back-rest of the folding seat to be tiltable.

Lastly, the present invention also concerns an aircraft, characterized in that it comprises a flight deck as described above.

BRIEF DESCRIPTION OF THE DRAWINGS

Details and advantages of the present invention will emerge more clearly from the following description, which is made with reference to the accompanying diagrammatic drawings in which:

FIG. 5 is a diagrammatic side view showing part of a folding seat according to the present invention in two positions, FIG. 6 is a diagrammatic side view representing a folding seat according to the present invention in a first position of use.

FIG. 7 corresponds to FIG. 6 for another position of use.

DETAILED DESCRIPTION

The present invention more particularly concerns a front portion of an aircraft able to receive at least three occupants, a pilot, a co-pilot and an observer (or other person). The front portion of the aircraft comprises the flight deck, or cockpit, in which the three occupants may place themselves.

Figure 1:
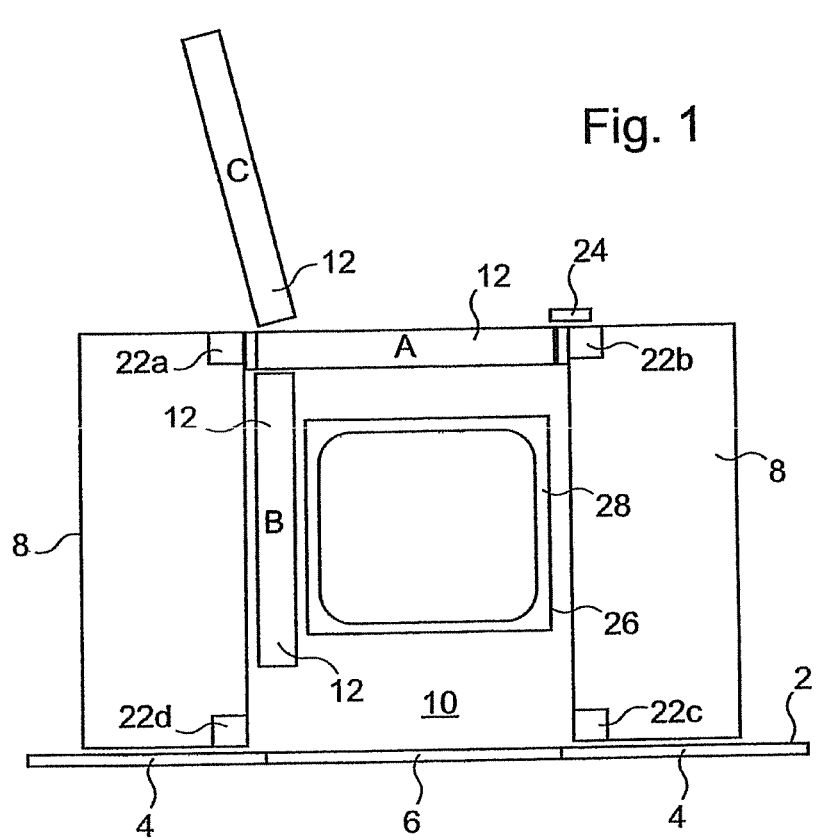
FIG. 1 is a partial diagrammatic view from above of a front portion of an aircraft according to the present invention.

FIG. 1 illustrates a partition wall 2 enabling separation in an aircraft of the flight deck from a cabin adapted to receive passengers and/or possibly freight. The various parts represented in FIG. 1 are all located towards the flight deck, on the same side of the partition wall 2. The partition wall 2 comprises fixed panels 4 and a door 6 represented here in its closed position.

The aircraft considered here is preferably an aircraft of average size but it may also be an aircraft that is either larger, or smaller. Aircraft of average size here means an aircraft which, when it is configured to receive passengers, comprises a cabin with seats—approximately 100 to 220 seats—disposed on opposite sides of a single aisle. An aircraft of Airbus A320 (trademark) type is representative of an aircraft to which for example applies (without limitation thereto) the present invention.

The flight deck of such an aircraft, in the embodiment represented in the drawings, integrates a high density of equipment (computers, systems, etc.). In an original manner, as illustrated in FIG. 1, a portion of this equipment is disposed in two cabinets 8. Each of these cabinets 8 is disposed against the partition wall 2, one on one side of the door 6, the other on the other side of that door. These two cabinets 8 together define a corridor 10 at one end of which is situated the door 6.

The corridor 10 gives easy and fast access to all the equipment located in the cabinets 8. It also participates in rendering secure the font part of the aircraft and the flight deck relative to a potential aggression coming from the cabin of the aircraft. As will be explained later, this corridor 10 may also be used as an isolation lock enclosure between the aircraft cabin and the zone of the flight deck receiving the pilot and co-pilot.

Figure 2:
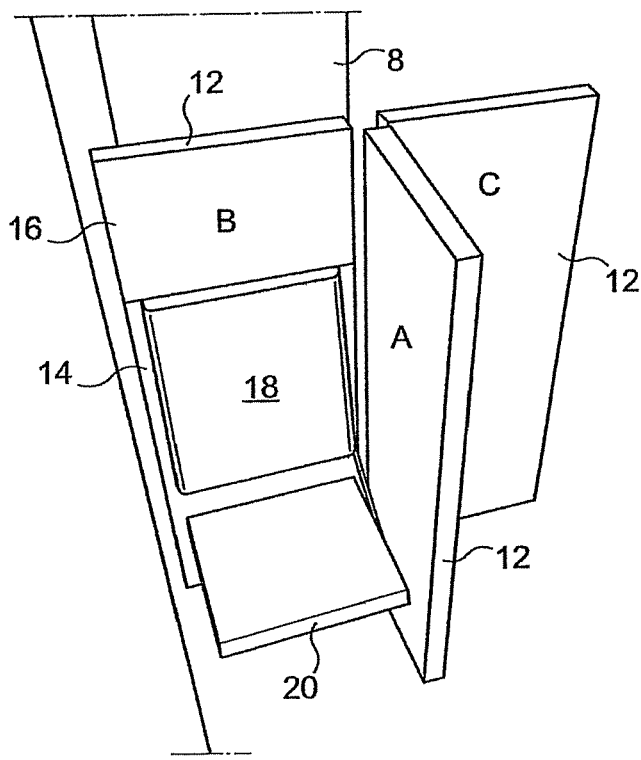
FIG. 2 is a perspective view showing three positions that can be adopted by a folding seat according to the present invention.

Also in an original manner, the present invention provides for equipping the corridor 10, towards the front thereof, that is to say between the door 6 and the zone of the flight deck occupied by the pilot and the co-pilot, with a pivotable folding seat 12, not fixed to the floor. This folding seat 12 may thus also fulfill the function of a door able to separate the corridor 10, or at least a part thereof, from the zone of the flight deck accommodating the pilot and co-pilot. A single folding seat 12 is provided in a flight deck but FIGS. 1 and 2 represent that folding seat in three different positions described later.

The folding seat 12 comprises a frame 14, preferably formed by a strong metal framework, on which are mounted a head-rest 16, a back-rest. 18 and a seat-rest 20.

The frame 14 is pivotally mounted on a structural upright 22a. In a preferred embodiment corresponding to the variant of the invention illustrated in the drawings, this is one of the structural uprights 22a, 22b, 22c and 22d used to form the cabinets 8. Here, the frame 14 is mounted using a double hinge (of saloon door type) on a structural upright 22a of the left cabinet 8 of the flight deck. The frame 14 has a front face corresponding to the face of the frame bearing the head-rest 16, the back-rest 18 and the seat-rest 20 as well as a back face opposite the front face. The structural upright 22a, in the same way as the other structural uprights 22b, 22c and 22d, is considered as being vertical and the frame 14 thus pivots about a vertical axis, parallel to said upright.

The seat-rest 20 is a substantially planar seat-rest which can be raised, is of rectangular shape (or more specifically flattened parallelepiped shape) and is pivotally mounted about a substantially horizontal axis so as to be able to adopt an operating position in which it is substantially horizontal and a folded position in which it is substantially vertical.

The back-rest 18 is also of rectangular general shape (or more specifically flattened parallelepiped shape). It may be fixed and joined to the frame 14 or else be movable relative thereto, as described later for preferred embodiments enabling the comfort of the folding seat 12 to be increased.

The head-rest 16 is also of rectangular general shape (or more specifically flattened parallelepiped shape). It may be fixed and joined to the frame 14 or else be movable relative thereto, as described later for preferred embodiments enabling the comfort of the folding seat 12 to be increased.

To limit the space occupied by the folding seat 12, the head-rest 16, the back-rest 18 and the seat-rest 20 are as thin as possible. Modern materials of foam type to produce seats make it possible to have folding seat components that are thin and comfortable at the same time.

To be favorable to the ergonomics of the front portion of the aircraft, in particular the system maintainability, that is to say to enable the various components to fulfill their functions as well as possible, it is provided here that the folding seat 12 can adopt three positions referenced by the letters A B and C (and possibly also positions intermediate between those three positions).

In the first position A, the folding seat 12 closes the corridor 10. The frame 14 and the various components constituting the folding seat 12 are dimensioned such that this closing of the corridor 10 can be achieved. Locking means 24 are provided for example to maintain the folding seat 12 in that first position A by cooperating with the structural upright 22b located facing the structural upright 22a on which the frame 14 is pivotally mounted.

In a second position B, the folding seat 12 is folded back inside the corridor 10 and abuts a cabinet 8. The folding seat 12 may for example be maintained in this position B using one (or more) straps not shown. The space occupied by the folding seat 12 in that position should be limited as much as possible in order not to degrade the ergonomics of the front portion of the aircraft with regard to that corridor 10. This position is used for example for an emergency evacuation which will be described later. It may also be used as a stowage position for the folding seat when it is not in use.

The third position C corresponds to another possible stowage position of the folding seat 12. In this position, the folding seat 12 is located entirely within the front space of the flight deck, forward of the cabinets 8, and enables good access to them.

The corridor 10 comprises a floor and a ceiling in conventional manner. In FIG. 1 there is represented a lower hatch door 26 formed in the floor of the corridor 10 and an upper hatch door 28 formed in the ceiling of the corridor 10.

Figure 3:
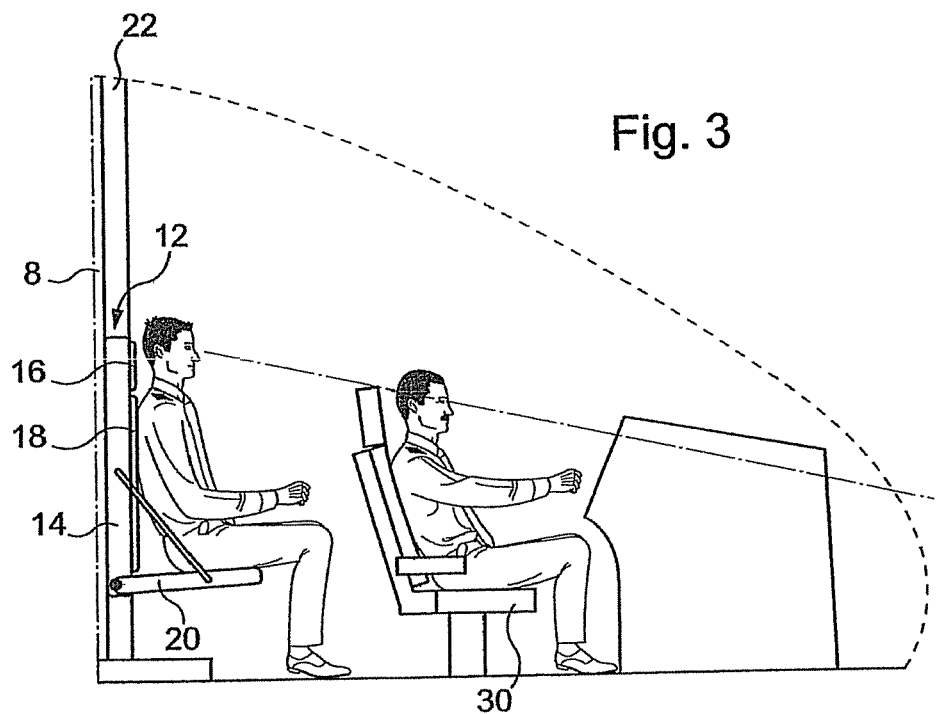
FIG. 3 is a diagrammatic side view of a front portion of an aircraft according to the present invention.

The folding seat 12 makes it possible to profit from the presence of an additional seat in the cockpit of the aircraft. In general this seat is for occasional use. It is for example dedicated to functions of pilot instruction. In this case, it is advantageous for the occupant of the seat to have as good (or almost as good) visibility to the exterior and of the instruments of the flight deck as that of the pilot and co-pilot. The folding seat 12 then provides, as illustrated in FIG. 3, a seat-rest that is raised relative to the seat-rests of the seats 30 adapted for the pilot and the co-pilot, in particular to take into account the fact that the folding seat 12 is set back relative to the seats 30. The folding seat 12 is also preferably disposed in a median position relative to the longitudinal axis of the aircraft and is thus situated in a position that is set back and median relative to the seats 30.

The seat-rest 20 of the folding seat 12 may have a height-adjustable position. Such an adjustment may be made for example using indexed strips (not shown) disposed on opposite sides of the corridor which may be adjusted manually. An electrical adjustment may also be provided using a rack and pinion system or a cable and pulley system. When the folding seat is used to receive an observer (for example during a pilot instruction phase) the seat 20 will be set in its highest position. When the folding seat is used to receive a member of the flight deck crew and avoid the use of a cabin seat, the seat-rest will be set in a low position, either the lowest position, or an intermediate position for example depending on the morphology of the person using the folding seat.

The solution provided enables the provision of security for the cockpit. To be precise, it is necessary in an aircraft to provide a configuration of the front portion of the aircraft enabling any intrusion by force from the cabin to the cockpit to be prevented. Solutions employing partition walls and armored security doors and optical peep-holes are thus provided. However, on exit from the cockpit by an occupant, however brief that exit, the placing in communication of the cabin zone and the piloting zone must be avoided. It is thus known to provide an isolation lock enclosure between the cabin zone and the piloting zone but the solutions proposed are in most cases detrimental in that the presence of the lock enclosure perturbs the cabin layout by taking space from it, and thus by potentially reducing the number of seats and thus the potential revenue from the aircraft. Furthermore, the integration of such a lock enclosure in an aircraft front portion is detrimental in terms of mass and production cost.

The configuration provided in FIG. 1 enables such a security lock enclosure to be produced which is not detrimental. The central zone aft of the flight deck which comprises the corridor 10 and which is associated with the folding seat 12 hinged to the lateral structures of that corridor enables the security lock enclosure to be well integrated. When it is in its first position A, the folding seat 12 plays the role of an isolation partition wall complement and becomes an anti-aggression barrier. The folding seat 12, the corridor 10 and the door 6 thus form a security lock enclosure which does not present the drawbacks described above for the security lock enclosures of the prior art. To be precise, this lock enclosure is integrated into the front portion of the aircraft while limiting any excess weight and any encroachment onto the cabin zone.

To fulfill it security function as well as possible, the folding seat 12 is advantageously provided with several features which are however optional.

Advantageously, the back portion of the seat-rest, of the back-rest and of the head-rest are reinforced by a shell, preferably a shell resistant to an impact from a bullet fired from a handgun. The back portion of the seat-rest corresponds to the part of the seat-rest not used by an observer (or other occupant of the folding seat). This definition of back face also applies for the back-rest and the head-rest. This orientation (front/back) is consistent with the front/back orientation chosen for the frame 14.

In its first position A, the folding seat 12 preferably has limited clearances with the structural uprights 22 between which it is located, and also between the folding seat and the ceiling and the floor. The clearance between the frame 14 and the structural uprights 22 is preferably of the order of the millimeter in the first position A. As for FIG. 4, this illustrates a possible integration in the upper portion and in the lower portion of the folding seat 12 in each case of a sliding plate 32. Each sliding plate 32 may adopt a position extended out from the folding seat 12 (left part of FIG. 4) and a retracted position (right part of FIG. 4). The sliding plates 32 are advantageously armored and are adapted to obturate the upper space and lower space of the corridor thus giving the appearance of a complete closure, as would be made by a door.

The locking means 24 of the folding seat enabling it to be locked in its first position A are advantageously operable from both sides of the folding seat 12 when it is in that first position but it is preferable to provide for the possibility, from the seats 30 of the pilot and of the co-pilot, of preventing unlocking of those locking means 24 from the corridor 10.

The folding seat 12 may also be provided with a control system, for example such as an optical peep-hole (not shown). Surveillance of the corridor 10 by video camera may also be provided instead of or in addition to the optical peep-hole.

Thus, when an occupant exits from the flight deck to the cabin of the aircraft, that occupant becomes positioned in the corridor 10. He then closes the corridor 10 by positioning the folding seat 12 in its first position A and locks it in that position. He also extends the sliding plates 32 manually or electrically. A locking system (not shown) for those sliding plates is provided to keep them in their extended position. It may be provided for the locking of the sliding plates 32 in their extended position and of the folding seat 12 in its first position A to be made in the same operation. The later opening of the door formed by the folding seat 12 (and the withdrawal of the sliding plates 32 into the folding seat) can only be performed from the zone of the cockpit situated forward of the folding seat 12, for example from the seats 30. The person wishing to leave the cockpit is then isolated in the corridor 10, the door 6 being supposed to be closed. After having looked through the optical peep-hole with which the door 6 is equipped or a monitor screen of a surveillance camera, said person may leave the corridor 10 and enter the cabin zone taking care of course to close the door 6 behind him. Self locking of the latter may advantageously be provided.

The front part of the aircraft generally comprises, below the flight deck, an equipment hold to which access may be obtained by a hatch door. It is assumed here that the aircraft considered comprises such an equipment lower hold. Its access is then provided by the lower hatch door 26 which advantageously and in an original manner is disposed in the corridor 10, just aft of the folding seat 12 when the latter is in closed position corresponding to the first position A.

To comfortably access the equipment hold, provision is generally made to integrate into said hold a ladder of sufficient length to enable facilitated access thereto from the level corresponding to the floor of the cabin and/or of the flight deck. This is a then a permanently fixed ladder. A certain number of adaptations of the surroundings are necessary in order for the ladder to be installed at a suitable location not excessively hindering the access to the various systems installed in the equipment hold and for it to be sufficiently rigid in use. Overall, the space of the technical hold is penalized by the presence of that ladder which limits the available space for installation of systems and/or access thereto.

In an original manner, as illustrated diagrammatically in FIG. 5, provision is made for integration into the back of the folding seat 12 of a ladder. The latter is for example a ladder with two sections 34 one of which slides relative to the other. These two sections 34 are mounted on the back face of the folding seat 12, for example on the back face of the frame 14, via a pair of four-bar linkage parallelograms 36 (one parallelogram on each side of the ladder). The pair of four-bar linkage parallelograms 36 enables the ladder to be spaced away from the folding seat 12 as illustrated in the right-hand part of FIG. 5. It can be noted here that it is possible for the ladder to comprise only one section (or on the contrary three or more sections).

The lower hatch door 26 is advantageously disposed in the corridor 10 such that when the folding seat 12 is in its first position A, with the hatch door open, the sections 34 of the ladder extend such that they "fall" into the equipment hold.

In this way, the ladder for access to the equipment hold no longer penalizes the space thereof (and does not penalize the space of the flight deck either). When someone wishes to access the equipment hold, he locks the folding seat 12 in its first position A, he opens the lower hatch door 26, lowers the ladder via the lower hatch door 26, and may then access the equipment hold. So as not to be hindered by the ladder, he may raise it. When his mission in the equipment hold has terminated, he again deploys the ladder through the lower hatch door 26, raises and folds the ladder and closes the lower hatch door 26.

The present invention also takes into account emergency evacuations from cockpits. It is also provided by regulations to enable emergency evacuation in case of a crash of all the cockpit crew within a very short time.

The most common solutions are evacuation by the opening of the lateral panes and the evacuation by a central hatch door disposed on the roof of the aircraft, generally set back as much as possible from the cockpit space.

The present invention provides evacuation by the roof. The presence of the upper hatch door 28 for that purpose can be seen in FIG. 1. In an entirely original manner, provision is made to use the folding seat 12 to achieve such evacuation. The folding seat 12 is then positioned in its second position B, or aft stowage position, in the corridor 10. In that position, it is then provided to lower the seat-rest 20 in order for it to come into its substantially horizontal position. It may then serve as a step for access to the upper hatch door 28. As the size of the seat-rest 20 is very great (relative to a stair step or ladder rung), the seat-rest 20 may be used to give oneself a boost and thus exit more easily by the upper hatch door 28. In this way, the exit procedure is simplified and made safe.

When an aircraft cockpit is provided with three seats, the third seat is provided for very occasional use. It is however increasingly often used by airline companies as an additional seat, enabling a company to fly its flight crew without occupying a fare-paying seat in the cabin. It may thus happen that the third seat is used of relatively long flights. The comfort of that seat is thus preferably improved relative to a basic folding seat.

When a passenger (a member of the flight crew for example) uses the third seat of the cockpit, the folding seat 12 according to the present invention is in its first position A. In the original configuration provided by the present invention, the space aft of that third seat, that of the corridor 10, is not used. It may thus be taken advantage of to increase the comfort of the passenger as illustrated in FIGS. 6 and 7. The corresponding seat may be tipped rearward.

To perform such tipping, a system of two pivots 38 and a system of two tie-rods 40 is provided.

The two pivots 38 are laterally mounted at the location of the seat-rest 20 so as to enable pivoting of the seat-rest 20 and of the back-rest 18 relative to the frame 14.

The two tie-rods 40 are provided on opposite sides of the assembly formed by the back-rest 18 and the seat-rest 20 and link that assembly to the frame 14. Each tie-rod 40 is pivotally mounted on the frame 14 and is attached to the back-rest 18, for example in the vicinity of the head-rest 16. By providing adjustment for the tie-rods 40 (adjustable length or attachment point movable on the frame for example), it is possible to adjust the inclination of the seat. The tie-rods may also be replaced by straps, it being possible for these to be adjustable.

Figure 8:
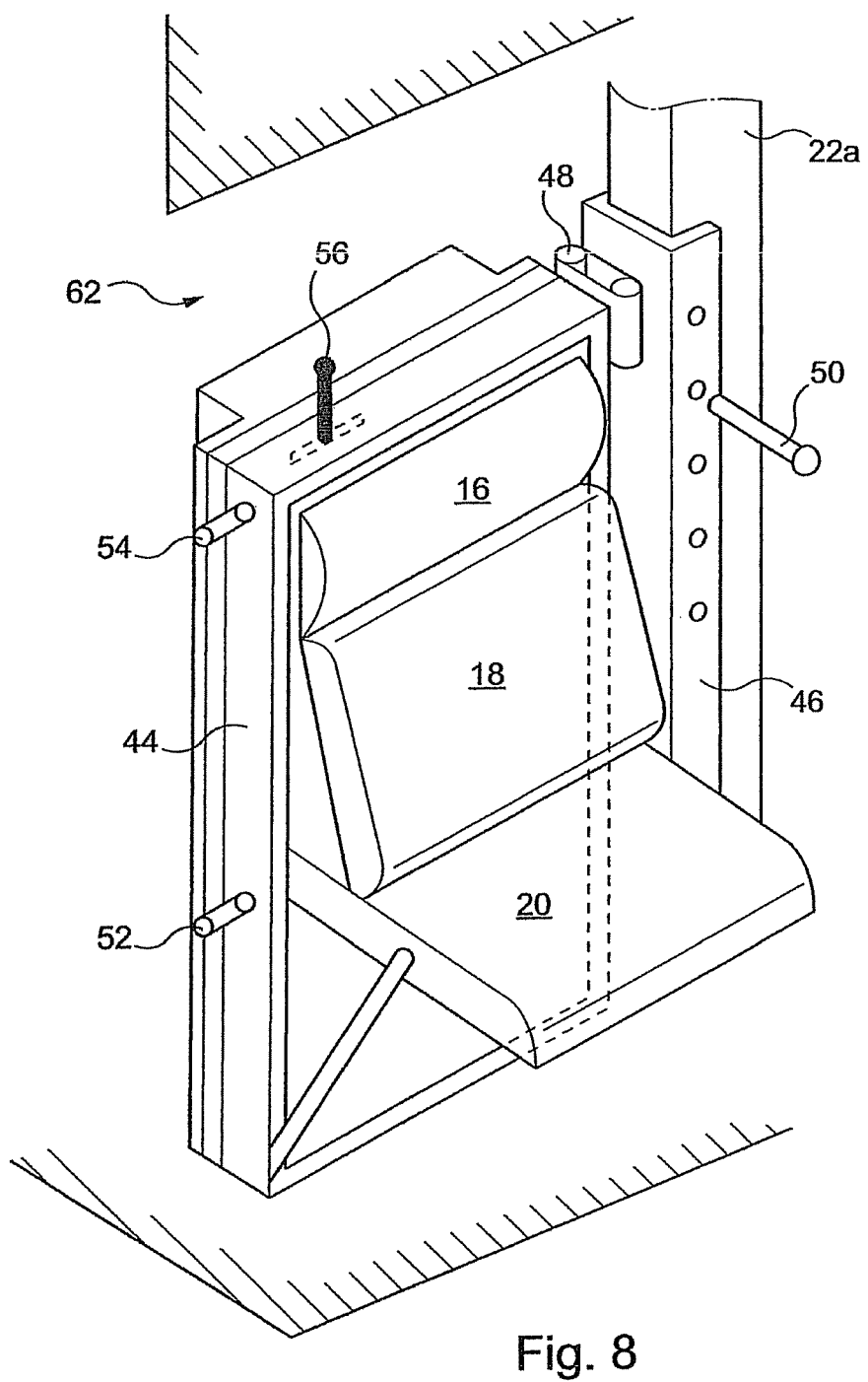
FIG. 8 is a perspective view of a folding seat according to the present invention.
Figure 9:
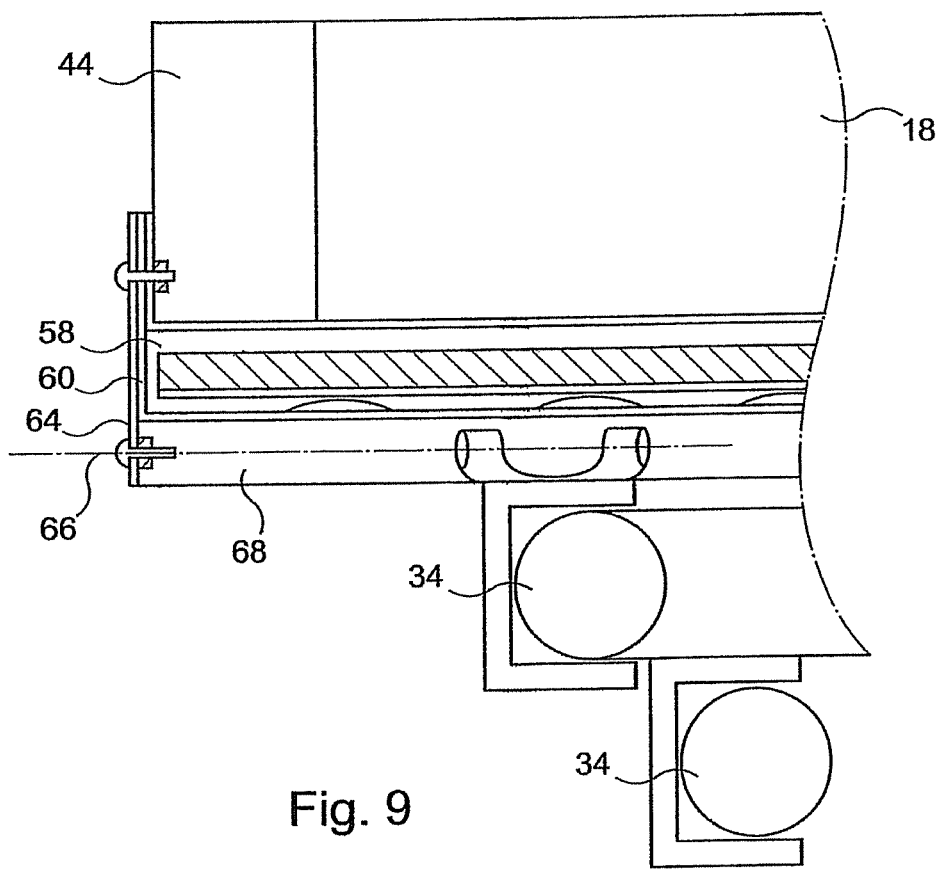
FIG. 9 is a detail view showing a partial cross-section on a substantially horizontal section plane of such a folding seat.

A variant embodiment of a folding seat according to the present invention is represented in FIGS. 8 and 9.

In this embodiment, the folding seat once again has a seat-rest 20, a back-rest 18 and a head-rest 16. These various components are mounted on a frame 44. The latter is pivotally mounted relative to the structural upright 22a via an intermediate member 46 of profiled cross-section and via double hinges 48.

The intermediate member 46 of profiled cross-section espouses the form of the structural upright 22a and may slide on it. In the embodiment represented in FIG. 8, the intermediate member 46 is a profiled member of U-shaped cross-section having a planar base whose width is adapted to the structural upright 22a and two lateral branches between which the structural upright 22a comes into place such that the intermediate member 46 can slide while limiting play along the structural upright 22a. In this way, height adjustment of the folding seat may be made. For this height adjustment, the intermediate member 46 slides along the structural upright 22a to the desired position. As illustrated in FIG. 8, provision may be made for manual movement and the holding in position of the folding seat using a pin 50 adapted to cooperate with holes in the intermediate member 46 and with holes in the structural upright 22a (these latter holes not being visible in FIG. 8). A motorized adjustment may also be provided. It is then possible to place a motor within the structural upright 22a to provide the height adjustment of the folding seat.

The double hinges 48 (of which only one can be seen in FIG. 8) are disposed between the intermediate member 46 of profiled cross-section and the frame 44. As for the embodiment described above, those hinges enable the frame 44 to pivot through more than 180°, for example up to 270°.

A horizontal pivot shaft 52 and a horizontal locking shaft 54 are provided on the opposite side of the frame 44 to the side bearing the double hinges 48.

The horizontal pivot shaft 52 extends through the frame 44 and comes into engagement with the intermediate member 46 of profiled cross-section. This horizontal pivot shaft 52 is thus advantageously used both as a shaft to make the seat-rest 20 of the folding seat pivot relative to the frame 44 and as a shaft to pivot the assembly of the frame 44 relative to its surroundings, here in particular the intermediate member 46 of profiled cross-section and the structural uprights 22a and 22b. The end visible in FIG. 8 of the horizontal pivot shaft 52 may withdraw towards the inside of the frame 44 or else come into engagement with the structural upright 22b or else an intermediate member (not shown) similar to the intermediate member 46 and mounted on the structural upright 22b. In the first position, the rotation about the double hinges 48 is free; in the second position, the frame 44 can pivot about the horizontal pivot shaft 52 by freeing the double hinges 48. The horizontal pivot shaft 52 participates in the second position in the locking of the frame 44 in its pivotal movement about a vertical axis.

The locking shaft 54 is a retractable shaft which can be accommodated inside the frame 44 or else project therefrom to cooperate with the structural upright 22b (or else the intermediate member not shown and mentioned above which is located on the structural upright 22b and similar to the intermediate member 46) and provide locking in vertical position of the frame 44 between the two structural uprights 22a and 22b. A lever 56 enables a rod linkage inside the frame 44 to actuate either the locking of the frame in its position aligned between the two structural uprights 22a and 22b, or to enable horizontal pivoting, or to enable vertical pivoting. A mechanism found inside the frame here is similar to a door or window mechanism referred to as tilt-and-turn.

Figure 4:
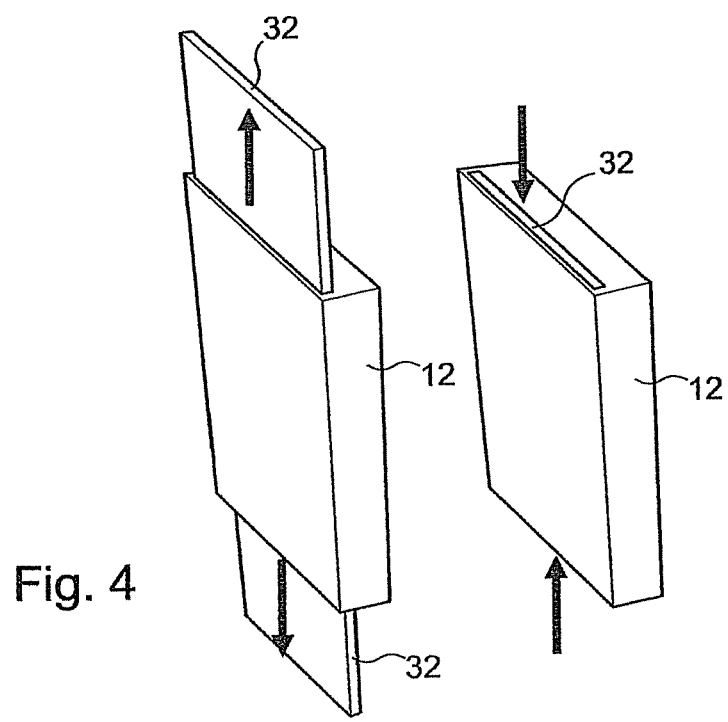
FIG. 4 is a perspective view of a detail, at large scale, of a folding seat according to the present invention.

FIG. 9 illustrates how a sliding plate such as that illustrated in FIG. 4 and a ladder such as that illustrated in FIG. 5 may be adapted and integrated into the folding seat of FIG. 8. This FIG. 9 is a partial cross-section view on a horizontal section plane of an edge of the folding seat and is at enlarged scale. First of all the frame 44 can be identified. It is assumed for example that the section plane chosen passes via the back-rest 18 of the folding seat. At the back of the back-rest there is an accommodation 58 closed by a cover 60 in which the sliding plate 32 is housed and from which it may exit, for example upwardly. In the example of FIG. 8, a space 62 above the folding seat can be seen. The latter may then be obturated by the sliding plate 32 when that plate slides upwards out from its housing. Similarly a sliding plate also accommodated in the housing 58 may close a lower free space between the folding seat and the floor of the corridor 10.

At the exterior of the cover 60, on the opposite side to the back-rest 18, the frame 44 bears two ladder sections 34. These ladder sections 34 are born by arms 64 of which only one is visible here. As illustrated, the fasteners of the cover 60 may be used for the fastening of the arms 64 onto the frame 44. A plate 68 (FIG. 9) is pivotally mounted about a pivotal axis 66 to enable a pivotal movement of the ladder about a substantially horizontal axis. Relative to FIG. 5, the plate 68 corresponds to two bars 36, one bar 36 of a four-bar linkage parallelogram on one side of the ladder and another bar 36 of the other four-bar linkage parallelogram on the other side of the ladder. A first section 34 of the ladder is hingedly mounted on the top of the upper plate 68 as illustrated in FIG. 9, it being possible for the hinge axis of the section 34 to coincide with the hinge axis 66.

The present invention thus provides an original folding seat and also provides an original layout for a front portion of an aircraft integrating such a folding seat.

In the description given above, which corresponds to a preferred embodiment, the folding seat may take several stowage positions in order to promote the ergonomics of the corresponding flight deck. The various adjustments that may be made with regard to the folding seat (tilt, height adjustment) enable it to be versatile. The folding seat may thus be used by an observer (preferably with the seat set in its highest position to promote good visibility of the instruments and through the windshield) or by a member of the crew itself on long flights.

The layout provided for the cockpit enables a high degree of security to be obtained in relation to an intrusion from the cabin into the flight deck without appreciable additional mass. It may be noted in this connection that the panels of the separation wall between the flight deck and the cabin zone do not need to be armored (or may be only slightly armored) since they are located against the system cabinets placed in the flight deck. An attack against those panels has little likelihood of success since the system cabinets "naturally" reinforce them.

The layout provided also presents original solutions for the access to an equipment hold disposed below the flight deck, and for emergency evacuation upwards of the members of the crew situated in the cockpit in case of accident.

The present invention is not limited to the preferred embodiment described above by way of non-limiting example and represented in the drawings. It concerns all the variant embodiments within the capability of the person skilled in the art in the context of the claims given below.

The invention claimed is:

1. A flight deck of an aircraft, the flight deck comprising:
control and/or viewing devices;
at least one seat;
an access door; and
a corridor for access to the at least one seat, which is closed at an opposite end to the at least one seat by the access door;
a folding seat comprising a frame which pivots about a vertical axis and on which are mounted a seat-rest and a back-rest, the folding seat being mounted in the corridor such that the folding seat is configured to pivot and adopt a first position in which the folding seat closes the corridor so forming a lock enclosure with the access door and a second position in which the folding seat enables the access to the at least one seat from the corridor.

2. The aircraft flight deck according to claim 1, wherein the folding seat is, in the second position, folded back against a member delimiting the corridor and is configured to adopt a third position pivoted through at least 135° relative to the second position.

3. The aircraft flight deck according to claim 1, wherein the corridor comprises a floor in which is located a hatch door for access to a lower equipment zone, and the hatch door is located behind the folding seat when the folding seat is in the first position.

4. The aircraft flight deck according to claim 1, wherein the corridor comprises a ceiling in which is located a hatch door for rescue and emergency evacuation, and the hatch door is located above the seat-rest when the folding seat is folded back against a member delimiting the corridor.

5. The aircraft flight deck according to claim 1, wherein the corridor is delimited laterally by furniture.

6. The aircraft flight deck according to claim 5, wherein at least one item of the furniture comprises a structural upright, such that the folding seat is pivotally mounted relative to the structural upright.

7. The aircraft flight deck according to claim 1, wherein the folding seat comprises an armored sliding plate in each of a lower portion and an upper portion of the folding seat.

8. The aircraft flight deck according to claim 7, wherein the folding seat in the first position closes the lock enclosure using the armored sliding plates.

9. The aircraft flight deck according to claim 1, wherein a back face of the folding seat is reinforced to be resistant to impact of projectiles from a firearm.

10. The aircraft flight deck according to claim 1, wherein the folding seat bears on a back face a ladder mounted via at least one four-bar linkage parallelogram, and wherein the back face of the folding seat opposes a face adapted to receive a user of the folding seat.

11. The aircraft flight deck according to claim 1, wherein the folding seat is adjustable in height.

12. The aircraft flight deck according to claim 11, wherein the folding seat is mounted on structural components of the flight deck via at least one intermediate member of profiled cross-section able to slide on the structural components bearing the folding seat.

13. The aircraft flight deck according to claim 1, wherein the back-rest of the folding seat is tiltable.

14. An aircraft comprising a flight deck according to claim 1.

* * * * *